US012643772B2

(12) United States Patent
Düzgün et al.

(10) Patent No.: US 12,643,772 B2
(45) Date of Patent: Jun. 2, 2026

(54) AUTHORIZABLE INDUSTRIAL CONTROL HANDLE WITH OPERATOR FEEDBACK FEATURE

(71) Applicant: ELFATEK ELEKTRONIK MAKINA VE OTOMASYONU SANAYI TICARET LIMITED SIRKETI, Konya (TR)

(72) Inventors: Bahattin Düzgün, Konya (TR); Süleyman Canan, Konya (TR); Kerim Karagözler, Konya (TR)

(73) Assignee: ELFATEK ELEKTRONIK MAKINA VE OTOMASYONU SANAYI TICARET LIMITED SIRKETI, Konya (TR)

( * ) Notice: Subject to any disclaimer, the term of this patent is extended or adjusted under 35 U.S.C. 154(b) by 80 days.

(21) Appl. No.: 18/853,147

(22) PCT Filed: May 12, 2023

(86) PCT No.: PCT/TR2023/050441
§ 371 (c)(1),
(2) Date: Oct. 1, 2024

(87) PCT Pub. No.: WO2024/043852
PCT Pub. Date: Feb. 29, 2024

(65) Prior Publication Data
US 2025/0236491 A1     Jul. 24, 2025

(30) Foreign Application Priority Data
Apr. 24, 2023   (TR) ................................ 2023/004481

(51) Int. Cl.
*B66C 15/06* (2006.01)
*B66C 13/56* (2006.01)
(Continued)

(52) U.S. Cl.
CPC ............ *B66C 15/065* (2013.01); *B66C 13/56* (2013.01); *G06K 7/10366* (2013.01);
(Continued)

(58) Field of Classification Search
CPC .. B66C 15/065; B66C 13/56; G06K 7/10366; H04L 12/40; H04L 2012/40215; H04L 2012/40273
See application file for complete search history.

(56) References Cited

U.S. PATENT DOCUMENTS 7,281,375 B1 * 10/2007 Holder ................... F16H 61/435
60/487
8,013,550 B1 * 9/2011 Young .................... A63H 19/24
446/7
(Continued)

FOREIGN PATENT DOCUMENTS

EP           1462408 A1    9/2004
JP       2001240373 A     9/2001
(Continued)

*Primary Examiner* — Thomas D Alunkal
(74) *Attorney, Agent, or Firm* — Bayramoglu Law Offices LLC

(57) ABSTRACT

An industrial control handle (joystick) structure used in the control of industrial cranes and other mobile hydraulic work machines provides the operator with visual feedback through built-in LED illuminations, tactile feedback through vibration motors, and auditory notifications through sound transmission hardware (such as a speaker, buzzer, etc.).

9 Claims, 2 Drawing Sheets

(51) Int. Cl.
 *G06K 7/10* (2006.01)
 *H04L 12/40* (2006.01)

(52) U.S. Cl.
 CPC .... *H04L 12/40* (2013.01); *H04L 2012/40215*
 (2013.01); *H04L 2012/40273* (2013.01)

(56) References Cited

U.S. PATENT DOCUMENTS

| | | | | |
|---|---|---|---|---|
| 9,272,889 B2 * | 3/2016 | Guglielmo | ............ | B66F 11/046 |
| 9,317,123 B2 * | 4/2016 | Provancher | ............ | G05G 9/047 |
| 10,145,084 B2 * | 12/2018 | Fredrickson | .......... | E02F 9/2012 |
| 10,331,233 B2 * | 6/2019 | Parazynski | ........... | G06F 3/0346 |
| 11,013,987 B1 * | 5/2021 | Pelissier | ................ | A63F 13/23 |
| 11,300,990 B2 * | 4/2022 | Battlogg | ................ | G05G 9/047 |
| 2008/0165025 A1 | 7/2008 | Morath | | |
| 2017/0252645 A1 * | 9/2017 | McClive | ................ | A63F 13/22 |
| 2018/0148302 A1 | 5/2018 | Hayashi | | |
| 2021/0166323 A1 * | 6/2021 | Fields | ................... | G06V 20/58 |

FOREIGN PATENT DOCUMENTS

| | | | |
|---|---|---|---|
| JP | 2019156527 A | 9/2019 | |
| JP | 2022106622 A | 7/2022 | |

* cited by examiner

AUTHORIZABLE INDUSTRIAL CONTROL HANDLE WITH OPERATOR FEEDBACK FEATURE

CROSS REFERENCE TO THE RELATED APPLICATIONS

This application is the national phase entry of International Application No. PCT/TR2023/050441, filed on May 12, 2023, which is based upon and claims priority to Turkish Patent Application No. 2023/004481, filed on Apr. 24, 2023, the entire contents of which are incorporated herein by reference.

TECHNICAL FIELD

The invention relates to an industrial control handle (joystick) structure used in the control of industrial cranes and other mobile hydraulic work machines. It provides the operator with visual feedback through built-in LED illuminations, tactile feedback through vibration motors, and auditory notifications through sound transmission hardware (such as a speaker, buzzer, etc.). The joystick structure also incorporates authorization through an RFID tag-receiver combination, allowing access only to specific individuals for its usage.

BACKGROUND

Within the relevant technical field of the application, the closest documents for systems where the operator, who will be using the joystick hardware, is authorized through an RFID tag-receiver combination, and where visual, tactile, and auditory warnings are transmitted to the operator based on specific criteria, are listed below.

In the patent document with the number JP2001240373, a joystick designed for use in cranes is described. Upon reviewing the relevant document, it identifies a technical problem where the operator fails to notice the initiation of rotation or movement with very slight joystick movements. In response to this problem, the technical solution presented indicates that a vibration sensation is provided to the operator as soon as the crane's movement begins, through communication with the joystick. In other words, the vibration in this case is not intended as a warning but rather to provide a sense of movement initiation.

In the patent document with the number EP1462408, a joystick structure is described where the rotational speed of the controlled crane can be adjusted. The aim in this document is to perform multiple functions with a single joystick. However, there is no mention of any visual, tactile, or auditory feedback in this context.

In the patent document with the number JP2022106622, a joystick structure is described for controlling a crane by an operator. It includes a function to lower the requested speed if it is deemed dangerous for the current load. However, there is no information in the document regarding a visual, tactile, or auditory structure specifically designed for warning purposes on the joystick.

SUMMARY

The aim of the invention is to inform the operator through a visual notification hardware comprising red, green, and blue LEDs. In the absence of any operator authorization, the LEDs flash at a slow speed to provide information to the operator.

Another aim of the invention is to comprise visual notifications through a visual notification hardware further comprising different color LEDs. After the authorization of the system, the joystick's vertical and horizontal movements, as well as risky situations, are indicated based on the data received from the main control unit.

Another aim of the invention is to provide tactile notifications through a method of applying short vibrations using vibration motors integrated into the joystick, specifically in response to changes in the joystick's horizontal and vertical movements divided into zones. This aims to enhance operator awareness. Additionally, it assists operators working with mobile cranes or similar machinery in situations such as lifting and loading, by helping them perceive small movements and maintain visual focus on the load (looking towards the load in the air) while the background may be disappearing.

Another aim of the invention is to enable the use of an RFID tag-receiver hardware combination for various functionalities. This comprises determining the authorized operators who can use the control joystick, identifying the control areas within the field for authorized operators, establishing permitted speed ranges for authorized operators, and defining the allowed working hour intervals for operators.

Another aim of the invention is to provide auditory (sound) notifications to the operator using the control joystick in case of warning and error information based on data received from the main control unit.

The equivalents of the numbering provided in the figures are as follows:

1. Visual notification unit
2. Tactile notification unit
3. RFID unit
4. Auditory notification unit
5. Control Handle X-axis movement

DETAILED DESCRIPTION OF THE EMBODIMENTS

The invention relates to an industrial joystick embodiment used in the control of industrial cranes. It provides visual notifications through LED illumination on the joystick to the operator, tactile notifications through vibration motors, auditory notifications through a sound transmission device, and authorization through an RFID tag-receiver combination, allowing access only to specific individuals.

The movement of the control handle in the X (5) and Y axes is being measured in the invention. The mentioned movement is limited to ±20 degrees, which is determined based on ergonomic considerations and mechanical strength tests. The control handle's movement measurement is achieved using a Hall effect sensor, which extends the lifespan of the invention by not having an electronic circuit connected to it. To enable this measurement, a fixed magnet is placed in the control handle mechanism. As the control handle moves, the magnets on it also move along the same axis. During this process, the angular movements in the two axes are determined through the trigonometric measurements of the magnetic field changes in all three axes, resulting in a formulation.

Figure 1:
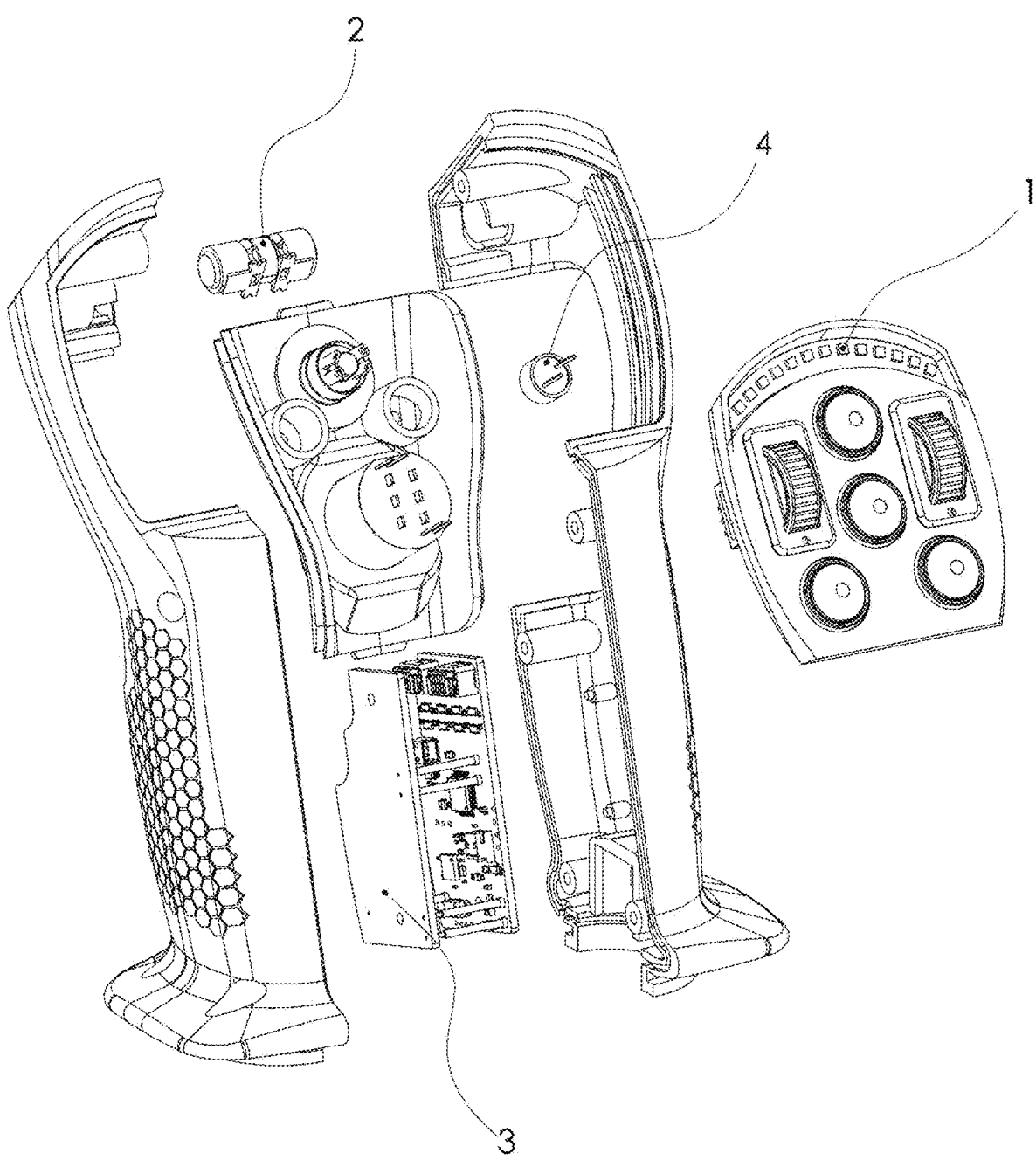
FIG. 1 shows an exploded View of the Control Handle (Joystick) Structure Subject to the Invention.
Figure 2:
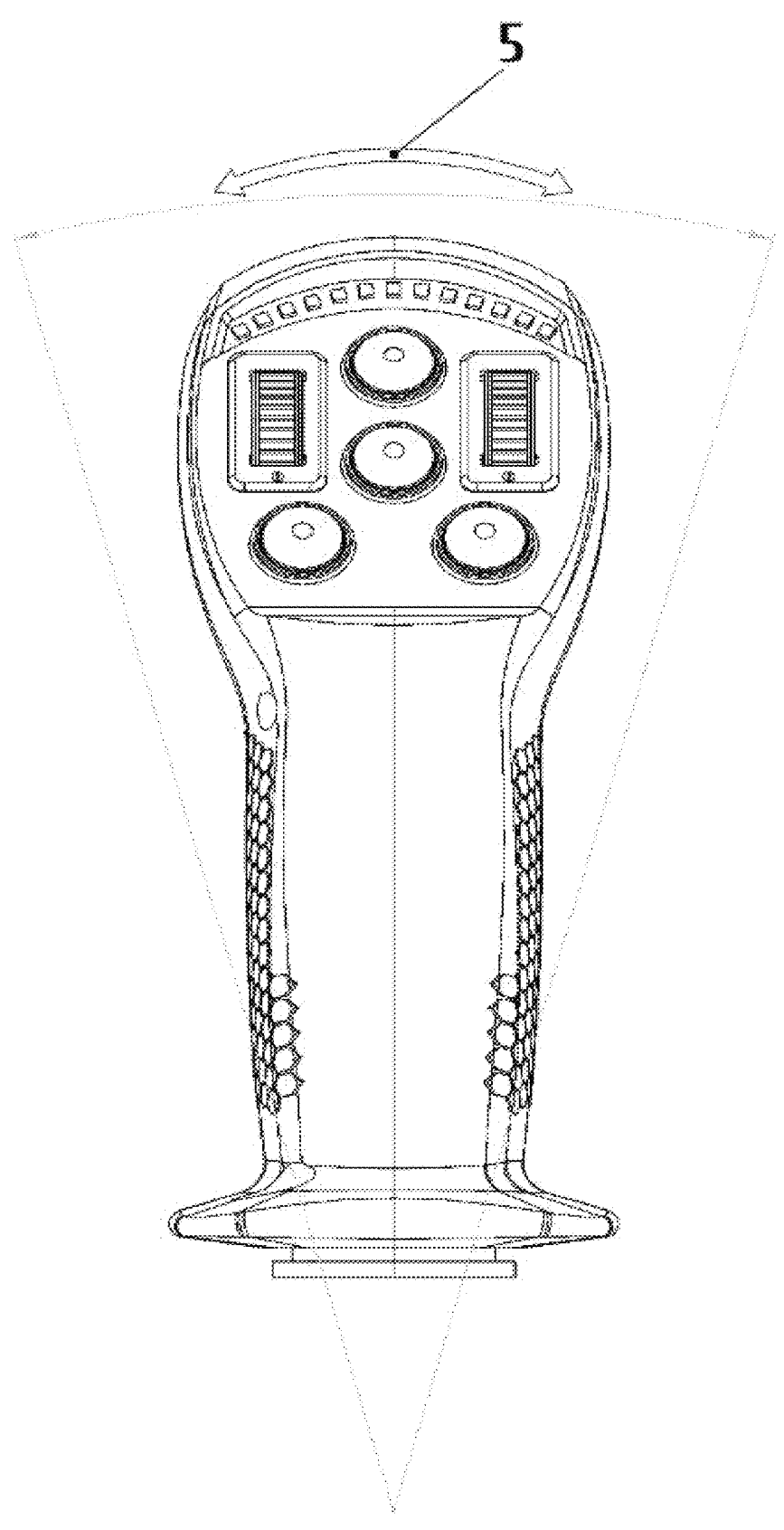
FIG. 2 shows a representation of X-axis Movement of the Control Handle (Joystick) Subject to the Invention.

The detected angle change data of the control handle is used to operate the visual notification unit (1) and the auditory notification unit (2) shown in FIG. 1. The angle change information obtained from the Hall effect sensor is transmitted to the microprocessor embedded in the control handle, enabling the execution of assigned functions in the units.

The visual notification unit (1) provides visual notifications in different colors for the X-axis movement and the Y-axis movement. The ±20 degrees movement of the control handle is divided into equal areas in the LED array of the visual notification unit (1). The LEDs in the visual notification unit (1) corresponding to each movement of the control handle are activated. When the control handle is at the center (0 degrees on the X and Y axes), the colored area located at the center of the visual notification unit corresponds to the angles and color codes, and it moves to the right or left by illuminating the LEDs to the right or left. The left side of the visual notification unit represents negative angle movements, while the right side represents positive angle movements.

The tactile notification unit (2), placed at the top of the control handle, transmits the X and Y-axis movement changes to the operator's hand through 100 ms duration vibrations using the Hall effect sensor. The tactile notification unit (2) works in conjunction with the visual notification unit (1). With each movement of the control handle, the tactile notification unit (2) informs the operator of the changes in the corresponding area of the visual notification unit (1) through vibrations. The tactile notification unit (2) comprises a vibration motor. It is activated or deactivated through the microprocessor integrated into the control handle based on the data received from the Hall effect sensor. This allows the tactile notification unit (2) to transmit the movement changes in the X and Y-axis to the user through vibrations.

Our invention, which operates on the CAN-Bus protocol, also detects error messages in this way. The CAN-Open interface, operating on the CAN-Bus protocol, enables multiple devices to be connected and communicate with each other. The mentioned interface sends error messages from a fixed address. When the microprocessor integrated into the control handle reads an error message from this address, notifies the operator by flashing all the LEDs in the visual notification unit (1) in a loop with a different color code for 500 ms. The audible notification unit (4) provides auditory warnings in a loop of 100 ms, while the tactile notification unit (2) applies vibrations to the control handle in a loop of 100 ms to provide the operator with a tactile warning.

Our invention comprises an RFID unit (3) for operator authorization, restriction, and tracking. The RFID unit (3) further comprises an RFID reader. When the operator's assigned card/tag is brought close to the reader, the card/tag is read. If the read card/tag information is connected to the system, it is sent to a local or cloud-based recording device via the CAN-Bus. The recording system then records the date and time of the reading along with the operator information for later examination. If there are any authorization or restriction rules for the operator who has scanned their card/tag, these rules are enforced through the microprocessor until the next power cycle. The current applied restrictions are as follows:

Limiting the speed parameter of the device used with the joystick, preventing inexperienced operators from using the device at dangerous speeds.

Allowing only specific operators to use certain vehicles, ensuring that the joystick cannot be activated by unauthorized users.

Preventing the active operator from working beyond the fatigue limit by providing a warning after a certain period determined by a hour meter following the initial reading.

Enabling the complete activation or deactivation of specific vehicle functions based on operator authorizations.

What is claimed is:

1. An authorizable industrial control handle with an operator feedback feature that operates within a CAN-Bus protocol, comprising:
a visual feedback unit for providing visual notifications,
a tactile feedback unit comprising a vibration motor for transmitting movement changes in X and Y axes through vibrations to an operator's hand,
an RFID unit for operator authorization, and
an auditory feedback unit comprising a sound transmission hardware for providing audible notifications.

2. The authorizable industrial control handle with the operator feedback feature that operates within the CAN-Bus protocol according to claim 1, comprising a Hall effect sensor for detecting movement within a limited range of ±20 degrees in the X and Y axes.

3. The authorizable industrial control handle with the operator feedback feature that operates within the CAN-Bus protocol according to claim 2, comprising a microprocessor, wherein the microprocessor executes assigned functions based on angle change information obtained from the Hall effect sensor.

4. The authorizable industrial control handle with the operator feedback feature that operates within the CAN-Bus protocol according to claim 1, comprising LEDs within the visual feedback unit, wherein a first color is assigned for X-axis movement, and a second color is assigned for Y-axis movement; and when the authorizable industrial control handle is in a center position (0 degrees on the X and Y axes, a colored area located at a center of the visual feedback unit moves to right or left by illuminating the LEDs on a right or left side of the visual feedback unit, respectively, based on angles and color codes of the X and Y axes, enabling an occurrence of a visual feedback.

5. The authorizable industrial control handle with operator feedback feature that operates within the CAN-Bus protocol according to claim 3, comprising the microprocessor configured to flash all LEDs within the visual feedback unit with a different color code upon receiving an error message via the CAN-Bus protocol, to run the auditory feedback unit to give audible alerts, and run the tactile feedback unit to apply vibrations to the authorizable industrial control handle to provide alerts.

6. The authorizable industrial control handle with operator feedback feature that operates within the CAN-Bus protocol according to claim 1, comprising an RFID reader within the RFID unit, wherein the RFID reader is in communication with the microprocessor.

7. The authorizable industrial control handle with operator feedback feature that operates within the CAN-Bus protocol according to claim 6, comprising a microcontroller, wherein the microcontroller is configured to send read card/tag information to a local or cloud-based recording device via CAN-Bus if a system is connected upon reading a card/tag when an operator brings the card/tag close to the RFID reader and applying defined authorization or restriction rules for an operator if there are any authorization or restriction who scanned the card/tag until a next power cycle.

8. The authorizable industrial control handle with the operator feedback feature that operates within the CAN-Bus protocol according to claim 2, comprising LEDs within the visual feedback unit, wherein a first color is assigned for X-axis movement, and a second color is assigned for Y-axis movement; and when the authorizable industrial control handle is in a center position (0 degrees on the X and Y axes, a colored area located at a center of the visual feedback unit moves to right or left by illuminating the LEDs on a right or left side of the visual feedback unit, respectively, based on angles and color codes of the X and Y axes, enabling an occurrence of a visual feedback.

9. The authorizable industrial control handle with the operator feedback feature that operates within the CAN-Bus protocol according to claim 3, comprising LEDs within the visual feedback unit, wherein a first color is assigned for X-axis movement, and a second color is assigned for Y-axis movement; and when the authorizable industrial control handle is in a center position (0 degrees on the X and Y axes, a colored area located at a center of the visual feedback unit moves to right or left by illuminating the LEDs on a right or left side of the visual feedback unit, respectively, based on angles and color codes of the X and Y axes, enabling an occurrence of a visual feedback.

* * * * *